March 17, 1936.　　W. E. UMSTATTD　　2,034,545

SHAFT BEARING

Filed Jan. 2, 1935

INVENTOR:
W. E. Umstattd
HIS ATTORNEYS

Patented Mar. 17, 1936

2,034,545

UNITED STATES PATENT OFFICE 2,034,545

SHAFT BEARING

William E. Umstattd, Canton, Ohio, assignor to The Timken Roller Bearing Company, Canton, Ohio, a corporation of Ohio Application January 2, 1935, Serial No. 21

5 Claims. (Cl. 308—216)

My invention relates to roller bearings for shafting, such, for instance, as the driving shaft sections of automotive axles. Heretofore it has been the practice to provide such shaft sections with integral ribs or shoulders and to press cones or inner raceway members over the end of such shaft sections until they abut against said ribs. This operation produces an undesirable concentration of stress in the shaft section at the base of the rib.

The principal object of the present invention is to devise means whereby the rib on the shaft may be dispensed with and the concentration of stress in the shaft avoided and whereby the separate bearing cone or inner raceway member may be dispensed with and the surface of the shaft made to perform the function of a raceway for antifriction rollers. The invention consists principally in dispensing with a separate bearing cone, adapting and hardening a portion of the shaft to function as a raceway and leaving the remainder of the shaft unhardened. It also consists in the parts and in the combinations and arrangements of parts hereinafter described and claimed.

Figure 1:
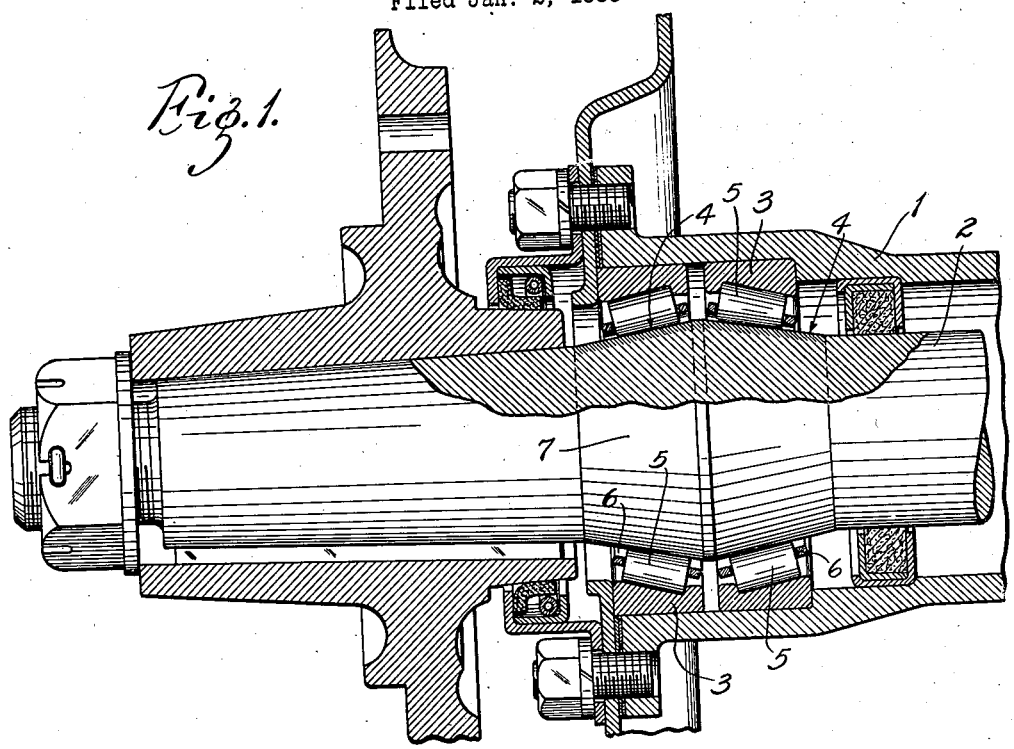
Figure 2:
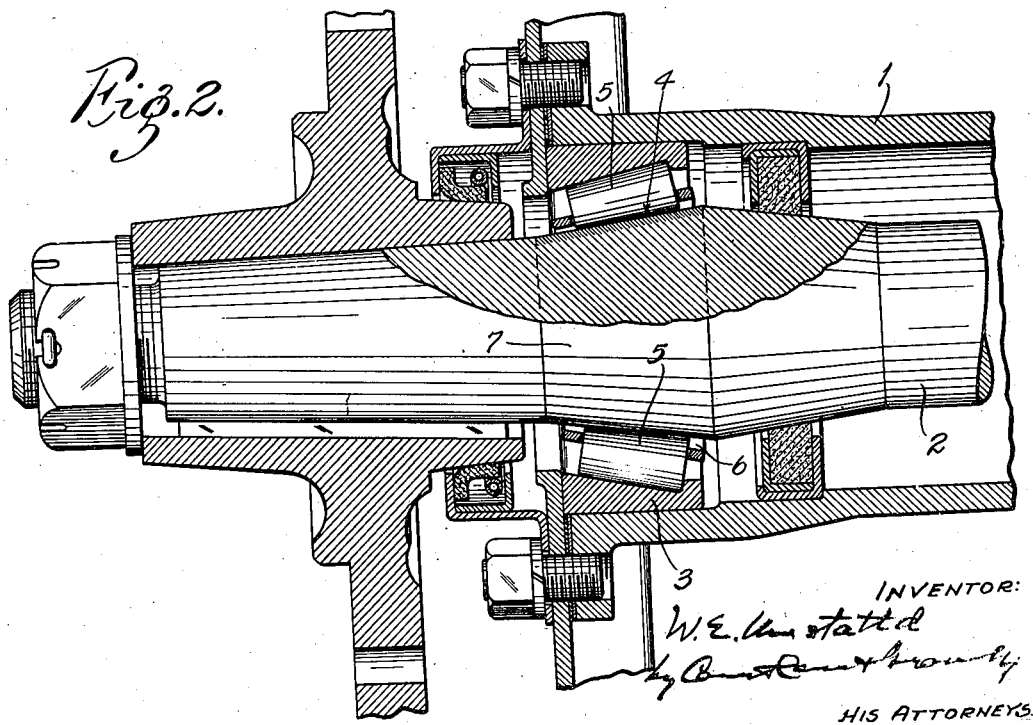

In the accompanying drawing, which forms part of this specification and wherein like symbols refer to like parts wherever they occur, Fig. 1 is a longitudinal view, partly sectional and partly in elevation, of the end portion of an automotive axle construction embodying my invention, the bearing shown therein having two rows of rollers; and Fig. 2 is a view similar to Fig. 1, the bearing shown therein having a single row of rollers.

The construction illustrated is the end portion of an automotive axle of well-known type. This type of axle comprises a housing 1, a driving shaft section 2 therein and roller bearings interposed between the housing and shaft section. In the construction illustrated, the roller bearing comprises a conical cup or outer raceway member 3 mounted in the end of the housing, a conical inner raceway 4 integral with the shaft, a series of taper rollers 5 interposed between the outer and inner raceway members, and a cage 6 of any suitable type for spacing and positioning the rollers.

In order to provide for the inner raceway, a portion 7 of the shaft is upset or otherwise thickened in the form of two cones arranged base to base; that is, the thickened portion tapers gradually in both directions from its thickest portion and merges with the main body of the shaft. Both of the conical surfaces, as in Fig. 1, or one of the conical surfaces, as in Fig. 2, are finished up and case hardened to fit them as raceway members for roller bearings, without, however, case hardening other portions of the shaft.

The shaft is preferably made of steel of substantially the following composition, namely:

Carbon about .55 percent to .65 percent.
Chromium about .45 percent to .75 percent.
Nickel about 1.50 percent to 2.00 percent.
Molybdenum about .30 percent to .40 percent.
Iron about 97.20 percent to 96.20 percent.

Steel of this composition has properties that are very desirable in a driving shaft and it is also well adapted for localized case hardening. As hardening of the whole shaft would greatly impair those properties that fit it for use as a shaft, it is important that case hardening be limited to the raceway portion thereof. For this purpose, it is preferable to case harden the raceway portion by the method commonly known as flame-hardening or by the use of an induction coil. In the flame-hardening process, a hot flame is directed against the region that is to be hardened so as to heat that region very rapidly without heating other portions of the shaft and the heated region is quenched quickly before its heat spreads to the regions adjacent. In the case of an induction coil, the region to be case hardened is encased within an induction coil and quickly heated and quenched without affecting the other portions of the shaft.

Among the advantages of my invention are the following: It saves the cost of manufacture of the separate cone or inner bearing member heretofore commonly used. It avoids the harmful concentration of stress in the shaft occasioned by the abrupt change of section at the base of the old shaft rib. It enables a larger bearing to be used in a given space and enables the end of the housing to be made with a smaller end to accommodate a suitable bearing. Another advantage is that steel of the composition above specified is especially adapted for localized case hardening under economical conditions and without adversely affecting other portions of the shaft.

While I have described my invention as applied to the driving shaft section of an automotive axle, it is applicable to other shafts also.

What I claim is:

1. The combination of an unhardened shaft having a locally hardened conical portion constituting a raceway for taper rollers, taper rollers on said raceway and a conical raceway cup enclosing said rollers, the surface of said conical portion merging at its small end directly into the general surface of the shaft and said cup having an inwardly extending rib at its large end.

2. The combination of an unhardened shaft having a thick portion in the form of two cones arranged base to base with their small ends merging directly into the general surface of the shaft, said cones having their surfaces locally hardened to constitute raceways for taper rollers, taper rollers on said raceways and conical raceway cups enclosing said rollers, each of said cups having an inwardly extending rib at its large end.

3. The combination of an unhardened shaft having a thick portion in the form of two cones arranged base to base with their small ends merging directly into the general surface of the shaft, one of said cones having its surface locally hardened to constitute a raceway for taper rollers, taper rollers on said raceway and a conical raceway cup enclosing said rollers, said cup having an inwardly extending rib at its large end.

4. An unhardened elongated shaft having a thickened portion in the form of two cones arranged base to base and integral with each other and the shaft with their small ends merging directly into the general surface of the shaft, the conical surface portions only of said cones being hardened to constitute raceways for rolling elements.

5. An elongated shaft having a thickened portion in the form of two cones arranged base to base with their conical surfaces meeting and with their small ends merging directly into the general surface of the shaft, the conical surface portion only of one of said cones being hardened to constitute a raceway for rolling elements.

WILLIAM E. UMSTATTD.